Aug. 17, 1965   R. F. MAYO ETAL   3,201,560
ELECTRIC-ARC HEATER

Filed March 12, 1963   2 Sheets-Sheet 1

INVENTORS
ROBERT F. MAYO
MILTON A. WALLIO
WILLIAM L. WELLS

BY
ATTORNEYS

INVENTORS
ROBERT F. MAYO
MILTON A. WALLIO
WILLIAM L. WELLS

BY

ATTORNEYS

United States Patent Office 3,201,560
Patented Aug. 17, 1965

3,201,560
ELECTRIC-ARC HEATER
Robert F. Mayo, Huntsville, Ala., and Milton A. Wallio and William L. Wells, Hampton, Va., assignors to the United States of America as represented by the Administrator of the National Aeronautics and Space Administration
Filed Mar. 12, 1963, Ser. No. 264,729
6 Claims. (Cl. 219—121)
(Granted under Title 35, U.S. Code (1952), sec. 266)

The invention described herein may be manufactured and used by or for the Government of the United States of America for governmental purposes without the payment of any royalties thereon or therefor.

This invention relates generally to an electric-arc heater, and more particularly to a magnetically diffused radial electric-arc heater.

Electric-arc heaters wherein the energy of the electric arc is utilized to heat a fluid medium to a high temperature have been the subject of extensive development in recent years as a result of the urgent need for high-temperature aerodynamic and heat transfer facilities. The many applications of the electric-arc heater include: utilization as a drive unit for test tunnels and magneto-hydrodynamic devices; the heating of gases for propulsion purposes; and the generation of a highly conductive gas flow for various experimental and practical purposes.

Electric-arc heaters generally consist of a pair of spaced electrodes connected by a power source for establishing an arc therebetween. The fluid medium to be heated is passed through the established arc whereupon an interchange of energy between the current carriers of the arc and the fluid medium occurs to raise the temperature of the fluid medium. Magnetic fields have been used in conjunction with the electric arc for various purposes. One such purpose is the obtaining of an area heat balance by physically moving the electric arc as a constricted column from one location to another along the electrodes without change so as to permit the use of cooled metallic electrodes. Magnetic fields have also been employed for randomly dispersing the electric arc in the direction of the fluid flow to thereby increase the duration of contact between the fluid and the arc, as disclosed in U.S. Patent No. 772,862.

These prior electric-arc heaters have exhibited several undesirable characteristics. One such characteristic is the inefficient utilization of the energy present in the arc for heating the fluid medium. This inefficient interchange of energy is due generally to the high velocity and relatively large mean free path length of the arc current carriers in the direction of the accelerating potential across the electrodes, and to the energy losses caused by the high-density impingement of the current carriers on the electrode surface. The high-density impingement of the current carriers on the electrode surface has the further adverse effect of causing a high electrode erosion rate, and resultant contamination of the heated fluid medium downstream of the arc. Another disadvantage inherent in prior art electric-arc heaters is the instability of the electric arc in the absence of regulating ballast in the electrical circuit connecting the electrodes.

Accordingly, it is an object of the instant invention to provide a new and improved electric-arc heater whereby the fluid medium is more uniformly and efficiently heated.

Another object of the instant invention is to provide an electric-arc heater wherein energy loss caused by high-density impingement of the current carriers on the electrode surface is greatly reduced.

Another object of the instant invention is to provide an electric-arc heater having a low rate of electrode erosion and decreased fluid medium contamination.

A further object of the instant invention is to provide an electric-arc heater wherein the arc has a positive effective resistance characteristic whereby voltage drop across the arc and arc power capability are greatly increased for a given current level.

A still further object of the instant invention is to provide a self-regulating electric-arc heater having highly stable arc operation and requiring no external regulating ballast.

The foregoing and other objects are attained in the instant invention by the provision of a pair of concentric, coaxially extending electrodes connected by an electrical circuit including a power source for establishing an arc across the electrodes. A field coil is positioned about the electrodes for creating an axial, high-intensity magnetic field having a transverse component to the established arc of the order of 7.5 gauss per ampere of arc current. This critical intensity is higher than that used in prior art arc heaters by about an order of magnitude. The coil is connected in the electrical circuit in series with the pair of electrodes and the arc struck therebetween. The series circuit containing the power source, the coil, the pair of electrodes and the arc results in highly stable arc operation without the necessity of any additional ballasting.

In operation, a pressurized fluid medium, such as air, is introduced into the arc region between the spaced electrodes so as to pass through the established arc. The interaction between the fluid medium and the arc current carriers serves to convert the arc electrical energy into heat energy of the fluid, thereby greatly increasing the temperature of the fluid medium. The heated fluid medium then passes through the downstream region of the settling chamber to its point of use.

The created high-intensity magnetic field, in addition to inducing rotation of the arc about the center electrode, causes diffusion of the arc by reducing the mean free path length of the arc current carriers in the direction of the accelerating potential. This magnetic diffusion of the arc results in numerous advantageous heater characteristics which include: more efficient conversion of energy from the arc to the fluid; higher power capabilities of the arc for given current levels; reduction of energy loss due to electrode sputtering and energy transfer to the electrode surface; and reduced rate of electrode erosion and subsequent contamination of the heated fluid medium.

Further, as a result of this high-intensity magnetic field, the arc current and voltage characteristics are primarily dependent upon the magnetic field conditions and can be matched effectively taking advantage of series operation of the arc current through the field coil. The coil then serves as a series resistive, inductive and regulating ballast maintaining essentially constant power throughout arc operation without additional electrical regulating controls.

Other objects and many of the attendant advantages of this invention will be readily appreciated as the same becomes better understood by reference to the following detailed description when considered in conjunction with the accompanying drawings, wherein.

Figure 1:
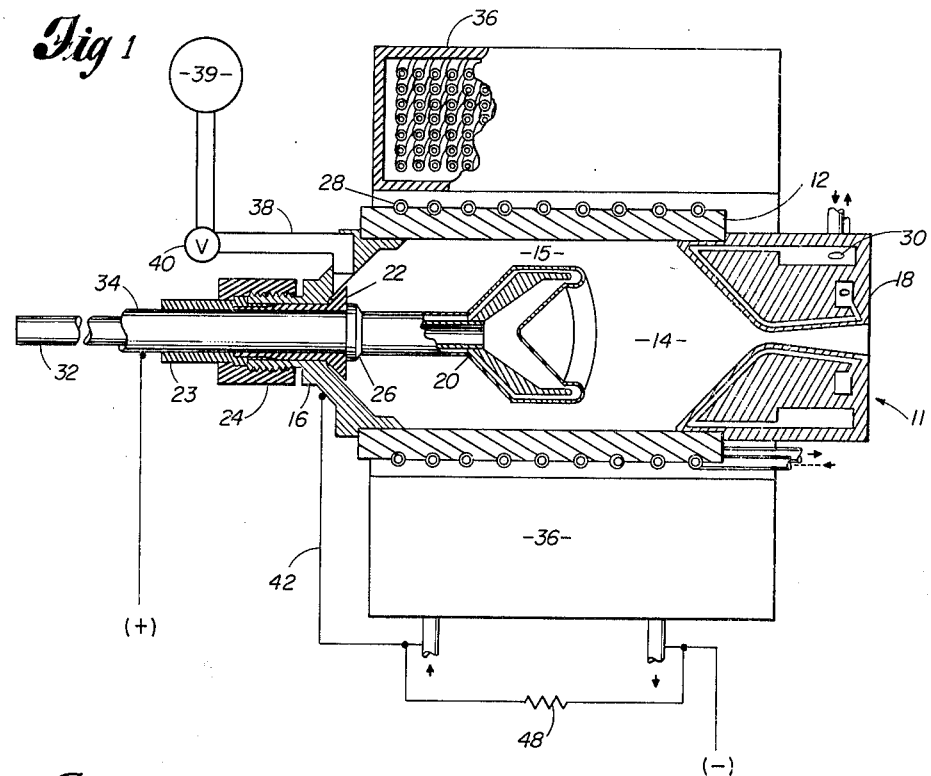
FIG. 1 is a schematic view partially in section of the electric-arc heater of the instant invention.

Referring now to the drawings, wherein like reference numerals designate identical or corresponding parts throughout the several views, the electric-arc heater 11 is illustrated in FIG. 1 as comprising an outer cylindrical wall electrode 12 defining a settling chamber 14. A head member 16 and a nozzle assembly 18 for enclosing chamber 14 are positioned at the forward and after ends of the wall electrode 12. The head member and nozzle assembly may be secured to the wall electrode 12 by conventional means such as locking rings, screw threads, or high temperature welding, the details of which are not shown. The outer wall electrode 12 serves both as a pressure vessel and as an electrode for the heater 11; however, if desired, an additional cylindrical non-magnetic steel wall member, not shown, may be superimposed about cylindrical electrode 12 to act as a high-strength pressure vessel. The electrodes, head, and nozzle are formed of a conductive metal, such as copper, in the preferred embodiment.

A center electrode 20 mounted in head member 16 extends axially into chamber 14. A ceramic insulator 22 and an entrance seal insulator 23 are positioned in the annular region between head 16 and electrode 20. The locking ring 24 secures the insulating members 22, 23 in place. A positioning ring 26 enables the center electrode 20 to be extended to selected positions along the chamber axis. It will be noted that the downstream face of the center electrode 20 has the shape of a cup with the lip facing downstream so as to overcome the tendency for the arc to attach to the downstream face of the center electrode.

Coolant passages 28, 30 are provided for the flow of a coolant, such as water, to cool the outer electrode wall 12 and nozzle assembly 18 respectively. The center electrode 20 is also provided with coolant passages 32, 34. The coolant water flows into the electrode through passage 32, circulates through the annular cup-shaped face of the electrode and flows out through passage 34. The coolant water supply means and controls are conventional details and as such are not shown.

A coil 36 for providing a high-intensity magnetic field directed axially of chamber 14 is positioned about the outer wall electrode wall 12. The coil 36 consists of copper tubing having the necessary configuration so as to create a magnetic flux intensity in the arc region 15 having a transverse component to the arc current in the order of 7.5 gauss per ampere, i.e., in the order of 10,000 gauss or more at electrode spacings and current levels of normal operation. A coolant is passed through the copper tubing for dissipating the heat produced by the high-density current flow in the coil.

The fluid medium to be heated enters through an inlet 38 in head member 16 so as to pass through the arc region 15 of the chamber 14. The fluid inlet may be designed so that the fluid is introduced into the chamber with a tangential swirl if desired. The fluid medium upon entrance into the chamber serves to cool the insulator 22, the head member 16 and the upstream end of the settling chamber wall. The inlet 38 is connected to a pressurized fluid supply 39 through a pressure regulator 40.

Figure 2:
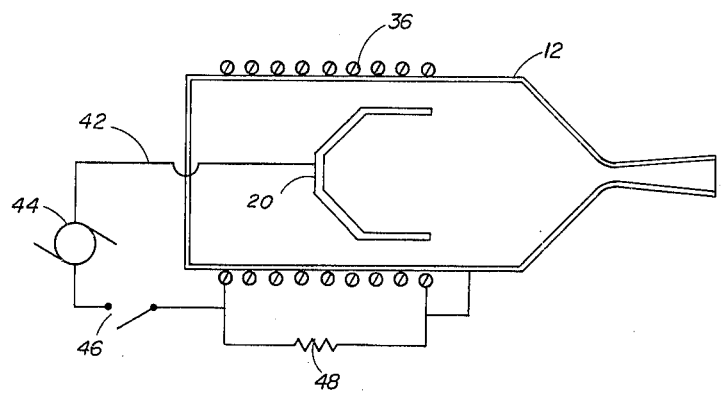
FIG. 2 is a diagram of the electrical circuit of the subject heater.

In FIG. 2 the electrical circuit of the arc heater is diagrammatically shown. The circuit 42 is connected across the electrodes 12, 20. The coil 36 is included in this circuit and is connected in series with the electrodes and the arc struck therebetween. The power source 44 shown as being a D.C. source is connected in the circuit for establishing the arc across the electrode gap. A circuit-breaker or switch 46 is utilized to open and close circuit 42, and a surge voltage limiting resistor 48 is connected in parallel across coil 36. Upon closing of switch 46 the electron current flow is from the source 44 through the coil 36 to the outer electrode 12, across the arc gap to the center electrode 20, and from the center electrode returning to the current source. The circuit has been described employing the outer wall as the cathode and the center electrode as the anode; obviously, the connections could be reversed to utilize the outer wall electrode as the anode and the center electrode as the cathode.

Upon initiation of current flow in the circuit, the current flow through the series coil 36 builds up a high-intensity magnetic field transverse to the arc which is established between the electrodes 12, 20. The coil is located and has a selected number of turns so as to create a magnetic field in the arc region 15 having a critical intensity of the order of 7.5 gauss per ampere—a flux density which is higher than that normally used in prior art heaters by about an order of magnitude. The effect on the arc of using this high-intensity field is the generating of a motion equivalent to rotation of the arc about the center electrode, wherein the diffusion of the arc current carriers is markedly increased in relation to subcritical magnetic field intensities.

The interaction between the electric field of the electrodes and the described transverse high-intensity magnetic field creates a force which is perpendicular to both of these vector quantities and which acts on the current carriers of the arc. In the absence of a magnetic field, the current carriers are accelerated by the voltage drop between the electrodes and have a high velocity and large mean free path length in the direction of this accelerating potential. However, the force created by the interaction of the electric and high-intensity magnetic fields serves to impart a curvilinear motion about the center electrode to these current carriers. This effectively increases their total path length in the direction of the accelerating potential.

This diffusion of the current carriers imparts numerous important characteristics to the arc. The reduced velocity component of the current carriers in the direction of the accelerating potential, i.e., voltage drop across the arc, obviously results in a lower energy transfer to the electrode surface from the impingement of the current carriers thereon and virtually eliminates electrode sputtering. Also, with the formation of a diffused arc discharge, the current density at the electrode surface is many times lower than in the case of the normal constricted arc. It is evident that this low current density results in a significant reduction in the rate of erosion of the electrodes and, therefore, in the contamination of the heated fluid stream.

The increased total path length of the current carriers in the electrode gap also results in an increased number of collisions with the fluid medium that the current carriers undergo thereby improving the conversion of arc energy into thermal energy of the fluid medium. This increased number of collisions additionally decreases the average velocity of the current carriers and reduces energy loss at the electrode surface.

Furthermore, the rotational period of the highly diffused arc about the center electrode has been brought within the ionization decay time of the heated fluid medium. This results in a higher amount of residual ionization of the heated fluid medium about the center electrode and a further increase in arc diffusion.

The presence of such a high-intensity magnetic field, of the order of 7.5 gauss per ampere, produces another surprising arc characteristic. At this critical intensity, the greatly increased arc diffusion results in a positive effective resistance characteristic for the arc. This is in direct contrast to a normal arc of the same current range which at subcritical magnetic field intensities is characterized by negative resistance, i.e., its resistance increases as its current decreases and vice versa. This peculiar negative characteristic of electric arcs is a major source of arc instability problems, and also limits the power capability of the arc at given current levels.

Figure 3:
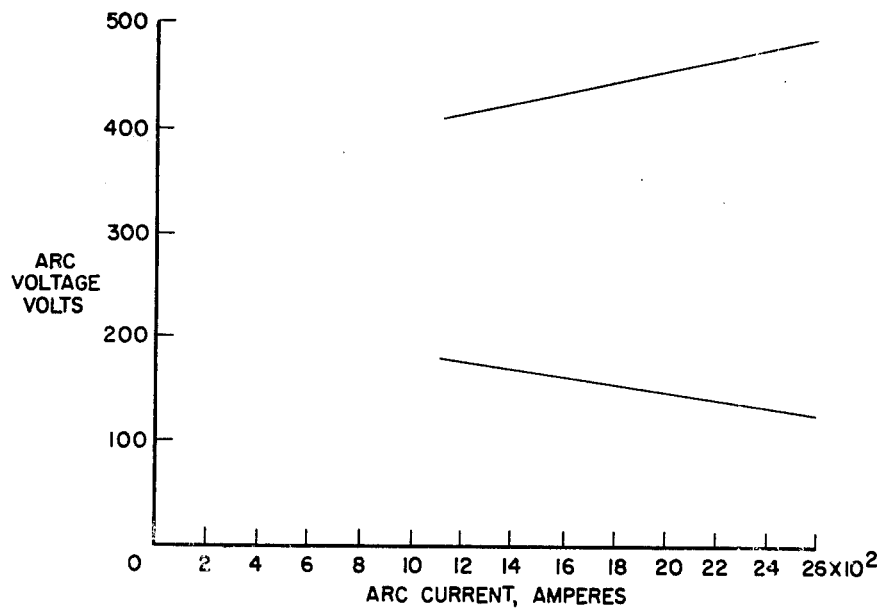
FIG. 3 is a plot of the arc voltage as a function of current illustrating the positive effective resistance characteristic of the instant invention.

This arc characteristic improvement is graphically set forth on the plot of FIG. 3 wherein the arc voltage is plotted as a function of current for the heater of the instant invention and compared with an exemplary prior art heater employing crossed electromagnetic fields. It will be noted that the top curve has a positive slope indicating the positive effective resistance. The lower curve shows the negative resistance characteristic that is typical of other arc heaters. FIG. 3 is presented merely to illustrate the differences in curve slope; direct comparison of the voltage levels should not be made since design parameters such as arc gap may not be the same in the other heaters. However, it will be seen that the voltage across the arc is greatly increased over that normally encountered in other heaters with the same current level and arc gap.

Figure 4:
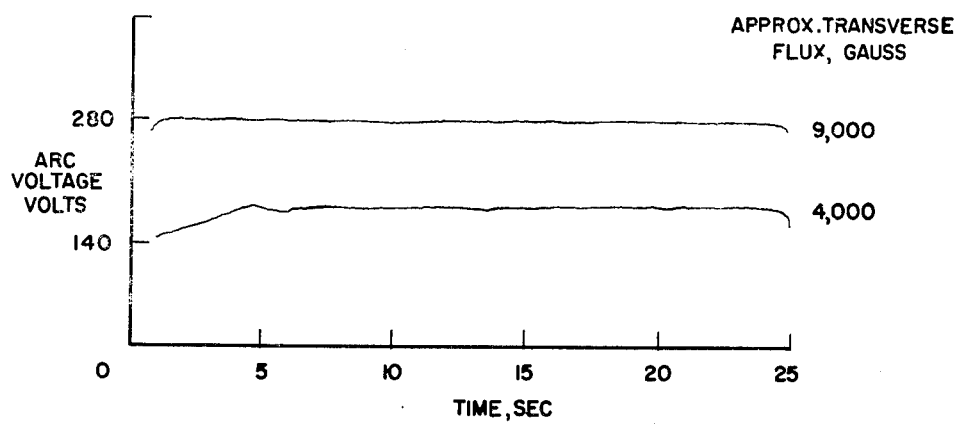
FIG. 4 is a plot of the effect of the high-intensity transverse magnetic flux level on arc voltage in the heater of the instant invention.

In FIG. 4 the effects of the transverse high-intensity field on arc voltage are illustrated. The voltage recorder traces of the subject heater operating at two different flux levels—a subcritical level of 4,000 gauss and a critical level of 9,000 gauss—are compared. It will be noted from the voltage record that the arc voltage for a given arc current is higher at the higher flux level. Inasmuch as the electrode spacing was not changed, and the fluid medium pressure remained the same, the voltage rise must be attributed to the influence of the increased magnetic flux.

The connection of the coil in series with the pair of electrodes is a significant feature of this invention. The series connection is made in order to obtain a completely self-regulating system without the use of external regulating controls. As a result of the high-intensity magnetic field, the arc current and voltage characteristics are primarily dependent upon the magnetic field conditions and can be matched effectively by taking advantage of series operation of the arc current through the magnetic coil. The series operation maintains a near constant ratio of transverse magnetic flux to arc current at the magnetic flux level of interest. The coil thereby serves as a series resistive, inductive and regulating ballast maintaining essentially constant power throughout arc operation without additional electrical regulating controls or ballast, as employed in prior art heaters. Also, due to this input power stability, the size of the settling chamber 14 required for pressure surges, and the energy loss attributable thereto, may be substantially reduced. As is evident from the above discussion, this novel self-regulating feature requires a flux density of the order of 7.5 gauss per ampere of arc current.

To facilitate understanding of the instant invention, the operation of one exemplary embodiment will now be briefly described. The switch 46 controls the start of the run upon closing and termination of the run upon opening. For arc starting, both high frequency starting units and simple electrode shorting techniques have been effectively utilized, since at the start the arc chamber is at atmospheric pressure and there is no fluid flow. Upon ignition of the arc, current flows through the series field coil and the magnetic field builds up. Arc gaps of from 1/8" to 1/2" have been used in this embodiment. The normal current range of operation is between 1100 and 2600 amperes, however arc currents as high as 3800 amperes have been employed. Under the influence of the high-intensity magnetic field, ranging from approximately 9,000 to 25,000 gauss or more depending on the arc current level and electrode gap, the arc begins to rotate. Soon the system is running at conditions that approximate those for steady state operation at atmospheric pressure. Next, the fluid, such as air, is introduced into the arc chamber and the pressure rises until a preset value is reached, at which point the regulator 40 cuts back the air flow as required to maintain a constant chamber pressure. Because of the inherent stability of the system, no other controls are required until the run is terminated by opening the circuit breaker. Operating pressure has been varied from atmospheric to 1,100 p.s.i.a., power from 30 to 1,200 kilowatts, and airflow from 0.025 to 0.318 pound per second in this exemplary embodiment.

It should be emphasized that the numerical examples given are not to be taken as limitations of the subject heater. The maximum power level, for example, is determined by the size of the power supply rather than by the heater. The maximum pressure is simply the mechanical design limit of the water-cooled electrodes.

Obviously, numerous modifications and variations of the present invention are possible in the light of the above teachings. It is, therefore, to be understood that within the scope of the appended claims the invention may be practiced otherwise than as described herein.

What is claimed as new and desired to be secured by Letters Patent of the United States is:

1. An electric-arc heater comprising: a cylindrical wall electrode defining an axially extending chamber; a head member enclosing the forward end of said chamber; a nozzle assembly positioned at the after end of said chamber; a second electrode positioned within said cylindrical wall electrode and extending coaxially therewith; said second electrode being supported in said head member; an electrical circuit including a uni-directional current source connecting said coaxial electrodes; a coil surrounding said wall electrode for providing a magnetic field directed axially of said chamber having a flux intensity of the order of 7.5 gauss per ampere of arc current in the region between said coaxial electrodes; said coil being connected in said circuit in series with said electrodes for providing highly stable, self-regulating arc operation; and means for introducing a pressurized fluid medium into said chamber whereby said fluid medium will be heated upon passage through the arc established between said electrodes.

2. In an electric-arc heater comprising a pair of coaxially extending electrodes, an electrical circuit including a current source connecting said electrodes, and a means for introducing a fluid medium to be heated into the gap between said electrodes, the improvement comprising: a coil positioned about said electrodes for providing a magnetic field having a flux intensity of the order of 7.5 gauss per ampere of arc current transverse to the arc established in the gap between said electrodes; said coil being connected in said circuit in series with said electrodes for providing highly stable, self-regulating arc operation.

3. A process of heating a fluid medium which comprises: establishing an electric arc between a pair of spaced electrodes; creating a high-intensity magnetic field transverse to said electric arc of the order of 7.5 gauss per ampere of arc current so as to diffuse the current carriers of said arc and increase the total path length of the arc current carriers between said spaced electrodes; and passing a pressurized fluid medium through the magnetically diffused arc whereby the fluid medium is heated by the interchange of energy between the current carriers of the arc and the fluid medium.

4. The process set forth in claim 3, wherein the created magnetic field has an intensity in the order of 10,000 gauss or more.

5. In a process for heating a fluid medium by passing the fluid medium through an electric arc, the improvement comprising: creating a magnetic field transverse to the arc having a flux intensity sufficiently high to impart a positive effective resistance characteristic to the electric arc, whereby the voltage across the arc for a selected arc current level, the arc power capability, and the interchange of energy between the current carriers of the arc and the fluid medium are markedly increased.

6. The process of claim 5, wherein the magnetic field has an intensity of the order of 7.5 gauss per ampere of arc current.

References Cited by the Examiner

UNITED STATES PATENTS

| | | | |
|---|---|---|---|
| 2,892,067 | 6/59 | Donald et al. | 219—75 |
| 2,941,063 | 6/60 | Ducati et al. | 219—75 |
| 2,944,140 | 7/60 | Giannini et al. | |
| 3,073,984 | 1/63 | Eschenbach et al. | |
| 3,182,176 | 5/65 | Bunt et al. | 219—121 |

RICHARD M. WOOD, *Primary Examiner.*

JOSEPH V. TRUHE, Sr., *Examiner.*